US012688233B2

(12) United States Patent
Zhang et al.

(10) Patent No.: US 12,688,233 B2
(45) Date of Patent: Jul. 21, 2026

(54) CONSTRUCTION OF POINT-IN-TIME GRAPH FOR ANALYTICS QUERIES

(71) Applicant: eBay Inc., San Jose, CA (US)

(72) Inventors: Hongjiang Zhang, Shanghai (CN); Xubin Chen, Shanghai (CN); Jun Li, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/935,891

(22) Filed: Nov. 4, 2024

(65) Prior Publication Data

US 2026/0127224 A1     May 7, 2026

(51) Int. Cl.
G06F 16/901          (2019.01)

(52) U.S. Cl.
CPC .............................. G06F 16/9024 (2019.01)

(58) Field of Classification Search
None
See application file for complete search history.

(56) References Cited

U.S. PATENT DOCUMENTS

| | | | |
|---|---|---|---|
| 7,822,717 B2 | 10/2010 | Kapoor et al. | |
| 9,501,550 B2 | 11/2016 | Zhang et al. | |
| 10,002,175 B2 | 6/2018 | Kemper et al. | |
| 10,133,997 B2 * | 11/2018 | McCann | G06Q 10/0633 |
| 11,537,554 B2 * | 12/2022 | Rawal | G06F 16/128 |
| 11,709,830 B2 | 7/2023 | Chen et al. | |
| 11,836,156 B2 | 12/2023 | Mitkar et al. | |

| | | | |
|---|---|---|---|
| 12,007,983 B2 * | 6/2024 | Pandis | G06F 16/2358 |
| 12,277,138 B2 * | 4/2025 | Pandis | G06F 16/2379 |
| 2023/0267130 A1 | 8/2023 | Galanis et al. | |
| 2024/0004867 A1 | 1/2024 | Pandis et al. | |
| 2024/0045834 A1 | 2/2024 | Kuchibhotla et al. | |

FOREIGN PATENT DOCUMENTS

| | | |
|---|---|---|
| CN | 113254725 | 8/2021 |

OTHER PUBLICATIONS

Chen, Hongzhi, "G TranA High Performance Distributed Graph Database With a Decentralized Architecture", Proceedings of the VLDB Endowment vol. 15 Issue 11, Jul. 2022, 14 pgs.
Rost, Christopher, "Distributed temporal graph analytics with GRADOOP", The VLDB Journal, May 2021, 27 pgs.
Zhang, Hongjiang, "How We Export Billion Scale Graphs on Transactional Graph Databases", [Online]. Retrieved from the Internet https innovation.ebayinc.com tech engineering how-we-export-billion-scale-graphs-on-transactional-graph-databases , Nov. 2023, 15 pgs.

* cited by examiner

*Primary Examiner* — Debbie M Le
(74) *Attorney, Agent, or Firm* — FIG. 1 Patents

(57)          ABSTRACT

A method for constructing a point-in-time global consistent graph is described. The method includes accessing a stream of data from a transactional graph database, receiving, at a scalable persistent computational platform that is separate from the transactional graph database, a graph analytics query that indicates a time attribute value, in response to receiving the graph analytics query, constructing, at the scalable persistent computational platform, a point-in-time graph snapshot based on the stream of data and the time attribute value, and processing, at the scalable persistent computational platform, the graph analytics query with the point-in-time graph snapshot.

20 Claims, 7 Drawing Sheets

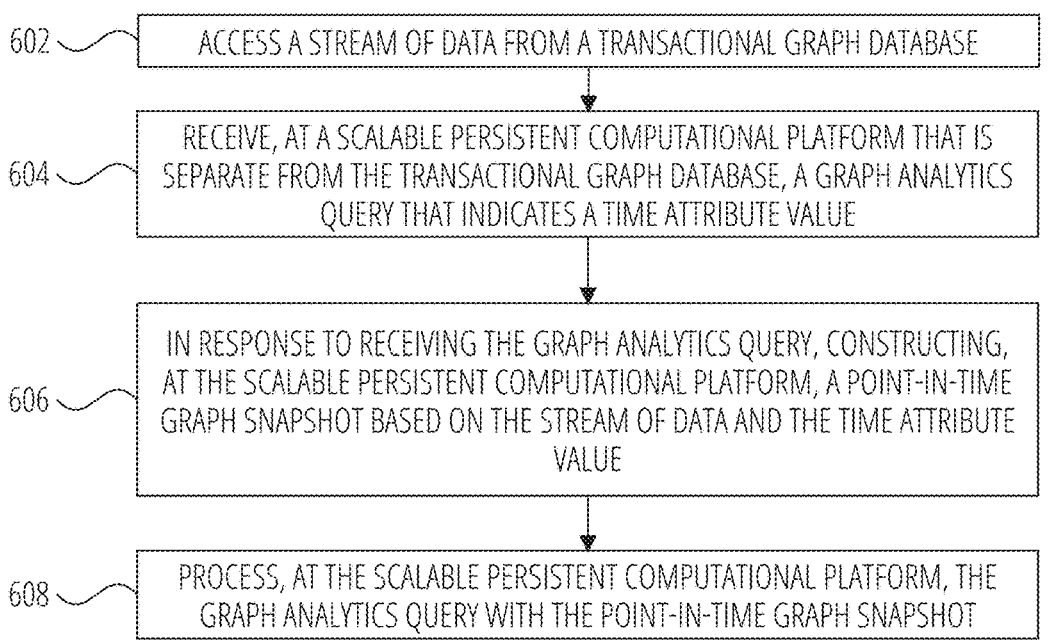

| | |
|---|---|
| 602 | ACCESS A STREAM OF DATA FROM A TRANSACTIONAL GRAPH DATABASE |
| 604 | RECEIVE, AT A SCALABLE PERSISTENT COMPUTATIONAL PLATFORM THAT IS SEPARATE FROM THE TRANSACTIONAL GRAPH DATABASE, A GRAPH ANALYTICS QUERY THAT INDICATES A TIME ATTRIBUTE VALUE |
| 606 | IN RESPONSE TO RECEIVING THE GRAPH ANALYTICS QUERY, CONSTRUCTING, AT THE SCALABLE PERSISTENT COMPUTATIONAL PLATFORM, A POINT-IN-TIME GRAPH SNAPSHOT BASED ON THE STREAM OF DATA AND THE TIME ATTRIBUTE VALUE |
| 608 | PROCESS, AT THE SCALABLE PERSISTENT COMPUTATIONAL PLATFORM, THE GRAPH ANALYTICS QUERY WITH THE POINT-IN-TIME GRAPH SNAPSHOT |

FIG. 6

CONSTRUCTION OF POINT-IN-TIME GRAPH FOR ANALYTICS QUERIES

TECHNICAL FIELD

The subject matter disclosed herein generally relates to the field of graph database management systems. Specifically, it addresses techniques for constructing and querying point-in-time graph snapshots for scalable graph analytics while maintaining high-performance transactional operations on graph databases.

BACKGROUND

Graph databases have become increasingly important for managing complex, interconnected data across various domains such as fraud detection, social networks, and recommendation systems. These databases excel at representing and querying relationships between entities, making them valuable for applications that require deep analysis of interconnected data. As the volume and complexity of data continue to grow, graph databases have evolved to handle both transactional and analytical workloads.

One type of graph analytics query includes a point-in-time graph query that allows users to retrieve and analyze the state of a graph database at a specific historical moment. This type of query enables users to examine the graph structure, relationships, and properties as they existed at a particular point in the past, rather than just the current state of the graph. Point-in-time graph queries are useful for applications such as fraud detection, root cause analysis, and understanding the evolution of complex systems over time.

However, managing historical data and providing efficient point-in-time querying capabilities while maintaining high-performance real-time operations has emerged as a significant challenge in the field of graph database management systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates a routine 600 in accordance with one example embodiment.

DETAILED DESCRIPTION

Figure 1:
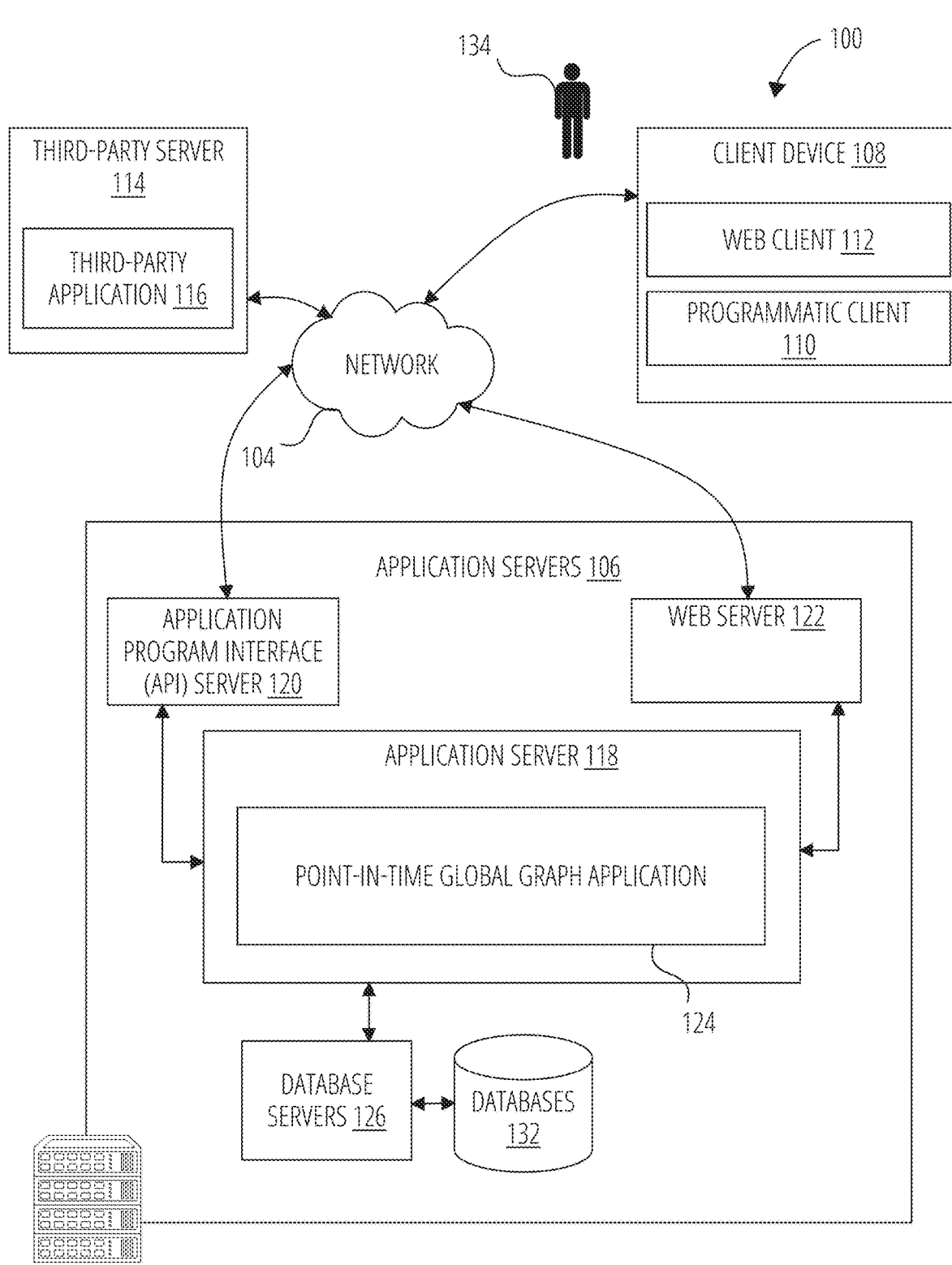
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The terms "merged mutation logs" and "unmerged mutation logs" refer to two types of logs used in a point-in-time graph query system. In one example, the term "merged mutation logs" refers to mutation logs that have been periodically combined or consolidated. For example, they are created at regular intervals (e.g., every 10 minutes) to optimize storage and processing efficiency. Merged logs represent accumulated changes in the database over a specific time window.

In one example, the term "unmerged mutation logs" refers to raw, individual mutation logs that have not yet been consolidated. They represent the most recent changes to the database that have occurred since the last merging process. Unmerged logs provide the most up-to-date information for constructing point-in-time snapshots.

Graph databases have become increasingly important for managing complex, interconnected data in various applications such as fraud detection, social networks, and recommendation systems. As data stored in graph databases continues to change over time, there is a growing need for querying historical states of the graph for analytics purposes.

Traditional graph databases primarily focus on serving real-time transactional queries, which require fast response times, typically less than 100 milliseconds. However, these databases often struggle to efficiently support both transactional and analytical workloads simultaneously, especially when dealing with historical data. Existing solutions for time-travel queries in relational databases are primarily focused on SQL tables and analytics queries.

While these solutions provide some historical data access capabilities, they are not optimized for graph structures and do not offer the ability to perform both transactional and analytical queries on graph data efficiently. Additionally, current graph database systems that attempt to track historical changes often face performance issues when handling large-scale analytics queries, as they typically require full graph scans and can interfere with ongoing transactional operations. This limitation highlights the need for a more efficient approach to managing and querying historical graph data without compromising the performance of real-time transactional operations.

The present application addresses the challenge of efficiently managing and querying historical graph data while maintaining high-performance transactional operations in graph databases. At a high level, the system described in the present application constructs point-in-time graph snapshots for scalable graph analytics queries, separate from the transactional graph database. The separation of the transactional graph database from the analytics platform allows for the efficient processing of both real-time transactional queries and historical analytics queries.

This separation is achieved by implementing a scalable persistent computational platform, such as a Spark/HDFS cluster, that works alongside the transactional graph database. The system captures a stream of data from the transactional graph database, which includes periodic snapshots of the database and a continuous stream of mutation logs. These snapshots and mutation logs are stored in the scalable persistent computational platform, providing the historical data for constructing point-in-time graph snapshots.

When a graph analytics query with a specific time attribute is received, the system constructs a point-in-time graph snapshot corresponding to the requested time. This construction process involves several steps:

1. Identifying the most recent database snapshot prior to the requested time.
2. Selecting the relevant mutation logs between the identified snapshot and the requested time.
3. Merging the selected snapshot with the appropriate mutation logs to create a point-in-time database snapshot.
4. Constructing a graph snapshot from the point-in-time database snapshot.

The system then processes the graph analytics query using the constructed point-in-time graph snapshot, all within the scalable persistent computational platform. In one example embodiment, the system handles both merged and unmerged mutation logs. The system periodically merges mutation logs (e.g., every 10 minutes) to optimize storage and processing efficiency. When constructing a point-in-time database snapshot, the system may use a combination of these merged logs and any unmerged logs that fall within the relevant time window. The system then constructs the point-in-time graph snapshot from the point-in-time database snapshot.

This approach offers several advantages:

1. It allows for efficient processing of transactional queries on the main graph database without interference from analytics operations.
2. It enables the construction of globally consistent graph snapshots at arbitrary points in time, supporting a wide range of historical analytics use cases.
3. It leverages scalable data storage and processing frameworks (like HDFS and Spark) to handle large volumes of historical data efficiently.
4. It minimizes the impact on the transactional database by not requiring additional data processing or metadata modifications beyond the ability to stream mutation logs.

In one example embodiment, a method for constructing a point-in-time global consistent graph is described. The method includes accessing a stream of data (e.g., mutation log stream) from a transactional graph database, receiving, at a scalable persistent computational platform that is separate from the transactional graph database, a graph analytics query that indicates a time attribute value, in response to receiving the graph analytics query, constructing, at the scalable persistent computational platform, a point-in-time graph snapshot based on the stream of data and the time attribute value, and processing, at the scalable persistent computational platform, the graph analytics query with the point-in-time graph snapshot.

As a result, one or more of the methodologies described herein facilitate solving the technical problem of efficiently processing analytical queries and transactional queries. As such, one or more of the methodologies described herein may obviate a need for certain efforts or computing resources that otherwise would be involved in accessing data directly from the transactional database's data store. As a result, resources used by one or more machines, databases, or devices (e.g., within the environment) may be reduced.

Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 106 provide server-side functionality via a network 104 to a networked user device, in the form of a client device 110. A web client 112 (e.g., a browser) and a programmatic client 110 (e.g., an "app") are hosted and execute on the web client 112.

An Application Program Interface (API) server 120 and a web server 122 provide respective programmatic and web interfaces to application servers 106. A specific application server 118 hosts a point-in-time global graph application 124, which includes components, modules and/or applications.

The point-in-time global graph application 124 may provide a number of functions and services to users who access the application servers 106. For example, the point-in-time global graph application 124 processes transactional graph queries and analytics graph queries. While the point-in-time global graph application 124 is shown in FIG. 1 to be part of the application servers 106, it will be appreciated that, in alternative embodiments, the point-in-time global graph application 124 may be separate and distinct from the application server 118. The point-in-time global graph application 124 is described in more detail below with respect to FIG. 2.

Further, while the network environment 100 shown in FIG. 1 employs a client-server architecture, the embodiments are, of course, not limited to such an architecture, and could equally well find application in a distributed, or peer-to-peer, architecture system, for example. The point-in-time global graph application 124 could also be implemented as a standalone software program, which do not necessarily have networking capabilities.

The web client 112 accesses the point-in-time global graph application 124 via the web interface supported by the web server 122. Similarly, the programmatic client 110 accesses the various services and functions provided by the point-in-time global graph application 124 via the programmatic interface provided by the Application Program Interface (API) server 120. In one example, the programmatic client 110 includes a client-based graph query application.

FIG. 1 also illustrates a third-party application 116 executing on a third-party server 114 as having programmatic access to the application servers 106 via the programmatic interface provided by the Application Program Interface (API) server 120. For example, the third-party application 116 may, utilizing information retrieved from the application server 118, support one or more features or functions on a website hosted by a third party.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 108 may be embodied within the network environment 100. Furthermore, some components or functions of the network environment 100 may be combined or located elsewhere in the network environment 100. For example, some of the functions of the client device 108 may be embodied at the application server 118.

Figure 2:
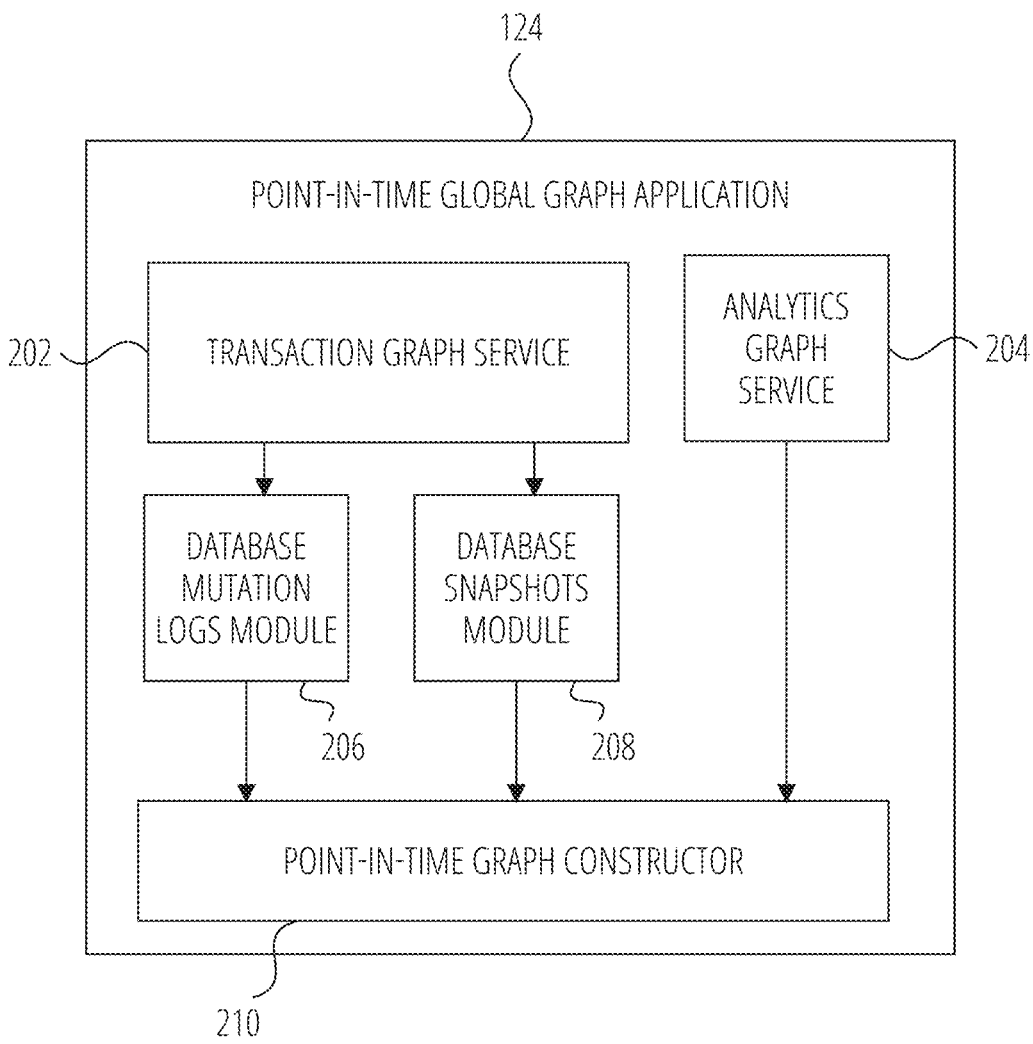
FIG. 2 is a block diagram illustrating a point-in-time global graph application that, in one example embodiment, is provided as part of a networked system.

FIG. 2 is a block diagram illustrating a point-in-time global graph application that, in one example embodiment, is provided as part of a networked system. The point-in-time global graph application 124 comprises: a transaction graph service 202, an analytics graph service 204, a database mutation logs module 206, a database snapshots module 208, and a point-in-time graph constructor 210.

The transaction graph service 202 handles the transactional aspects of the graph database. For example, the transaction graph service 202 receives and processes online transactional graph queries. The transaction graph service 202 accesses a transactional graph database (e.g., stored in databases 132 or another server).

The database mutation logs module 206 is responsible for accessing database mutation logs from the transactional graph database and storing the database mutation logs at a scalable persistent computational platform. The database snapshots module 208 is responsible for accessing database snapshots from the transactional graph database and storing the database snapshots at the scalable persistent computational platform.

The analytics graph service 204 receives and processes graph analytics queries with a historical time attribute. When a query with a specific historical time (e.g., time t) is received, the point-in-time graph constructor 210 uses the data from the database mutation logs module 206 and database snapshots module 208 to construct an accurate representation of the graph at the requested point in time from the accurate database snapshot at the requested point-in-time. For example, the point-in-time graph constructor 210 builds a point-in-time graph snapshot based at time t based on the database mutation logs and database snapshots. In another example, the point-in-time graph constructor 210 identifies database mutation logs and database snapshots mapped to a time window based on the time t. In another example, the point-in-time graph constructor 210 merges the database mutation logs identified in the time window.

FIG. 2 illustrates the separation between the transactional and analytical aspects of the graph database system. This separation allows for efficient processing of both real-time transactional queries and historical analytics queries without interference.

Figure 3:
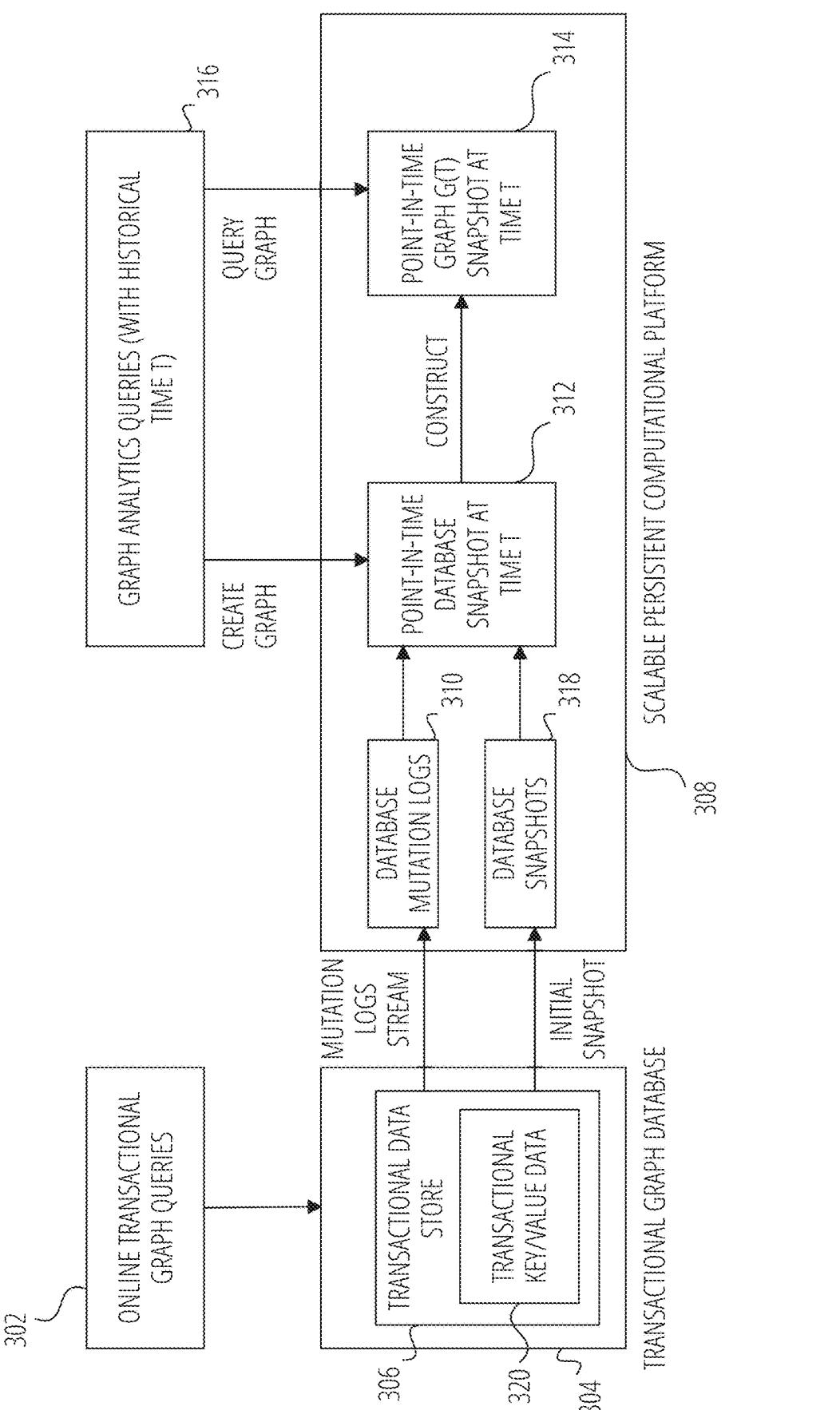
FIG. 3 is a block diagram illustrating an architecture of the subject matter in accordance with one example embodiment.

FIG. 3 is a block diagram illustrating the process of constructing a point-in-time database snapshot and graph snapshot for graph analytics queries. Transactional graph database 304 receives and processes online transactional graph queries 302. In one example, the transactional data store 306 includes transactional key/value data 320. The database mutation logs module 206 generates a stream of database mutation logs 310. The database snapshots module 208 generates database snapshots 318. In one example, the transactional data store 306 sends a continuous stream of database mutation logs 310 to the scalable persistent computational platform 308 (e.g., Spark/HDFS). In one example, an initial database snapshot of the transactional data store 306 is taken and stored in the scalable persistent computational platform 308.

When the point-in-time graph constructor 210 receives a graph analytics query with a specific historical time T (e.g., graph analytics queries (with historical time t) 316), the point-in-time graph constructor 210 constructs a point-in-time database snapshot at time t 312 at the scalable persistent computational platform 308. In one example, the point-in-time graph constructor 210 retrieves the most recent database snapshot before time T and applies the relevant database mutation logs up to time T.

After the point-in-time database snapshot at time t 312 is created, the point-in-time graph constructor 210 constructs a point-in-time graph G(t) snapshot at time t 314 constructed based on the point-in-time database snapshot at time t 312. The point-in-time graph G(t) snapshot at time t 314 is at historical time T is then used to process graph analytics queries specific to the historical time T.

The architecture shown in FIG. 3 enables the system to efficiently handle both transactional queries on the current state of the graph and analytical queries on the historical state of the graph. By separating the transactional database from the analytics platform, the system can maintain high performance for real-time operations while allowing for complex historical analysis without interference.

Figure 4:
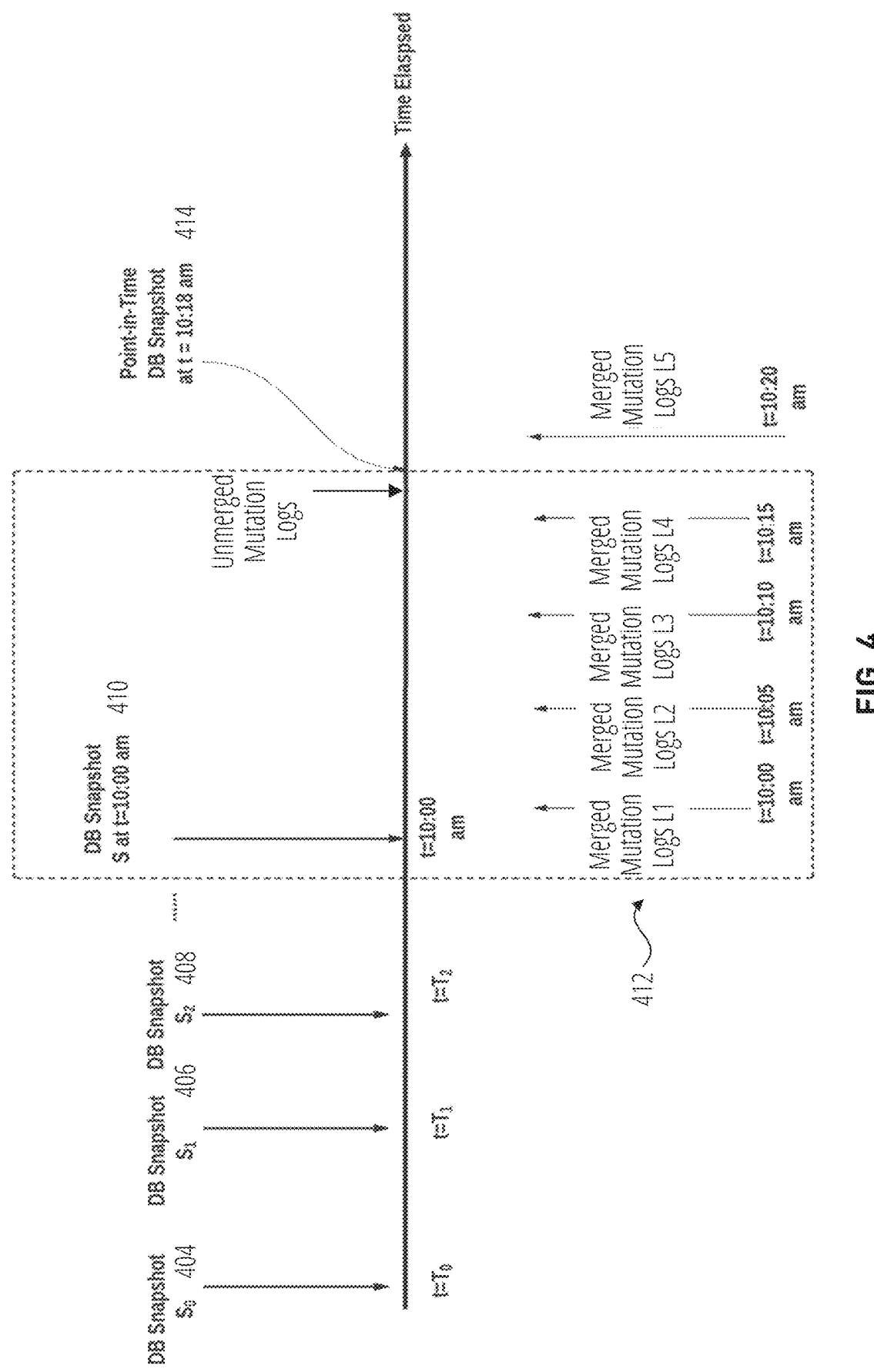
FIG. 4 is a diagram illustrating a timeline in accordance with one example embodiment.

FIG. 4 is a diagram illustrating an example of how to build a point-in-time database snapshot at a specific time t=10:18 am. FIG. 4 shows multiple database snapshots (database snapshot S0 404, database snapshot S1 406, database snapshot S2 408) taken at different points in time. A specific database snapshot S (e.g., database snapshot S at 10:00 am 410) is highlighted at t=10:00 am, which serves as the base for constructing the point-in-time snapshot.

The horizontal axis represents the elapsed time, with specific time points marked (T0, T1, T2, 10:00 am). FIG. 4 shows multiple merged mutation logs 412 (L1, L2, L3, L4, L5) generated at 5-minute intervals from the stream of mutation logs (e.g., unmerged mutation logs from database mutation logs 310). Each merged mutation log represents the accumulated changes in the database over a 5-minute window. It is noted that the mutation logs merging window (e.g., 5-minute window) is configurable.

For the point-in-time graph snapshot construction, the goal is to construct a point-in-time database snapshot at t=10:18 am, and from this point-in-time database snapshot to further construct the point-in-time graph snapshot. The process starts with the closest DB snapshot at t=10:00 am (18 minutes before the target time). To construct the point-in-time snapshot at 10:18 am, the point-in-time graph constructor 210 processes merged mutation logs L1 (10:00 am), L2 (10:05 am), L3 (10:10 am), and L4 (10:15 am). There is a time gap between L4 (10:15 am) and the target time (10:18 am). Thus, the unmerged mutation logs that are produced from database mutation logs 310 are processed further. The point-in-time graph constructor 210 applies the processed mutation logs to database snapshot S at 10:00 am 410 to construct the point-in-time database snapshot at 10:18 am 414.

In another example, the point-in-time graph constructor 210 defines a time window based on the time attribute query (e.g., 10:18 am), a last database snapshot relative to the time attribute query (e.g., database snapshot S at 10:00 am 410), and merged mutation logs 412 between the last database snapshot (e.g., database snapshot S at 10:00 am 410) and the point-in-time database snapshot at 10:18 am 414.

FIG. 4 illustrates constructing a point-in-time database snapshot at 10:18 am 414 by utilizing a combination of periodic database snapshots and incrementally merged mutation logs. This allows for flexible querying of historical states while minimizing the amount of data that needs to be processed for each query. The periodic merging of mutation logs (every 5 minutes in this example) helps to optimize storage and processing efficiency, while still allowing for fine-grained temporal resolution in constructing point-in-time snapshots. After the point-in-time database snapshot at time t 312 is constructed for historical time T, the point-in-time graph constructor 210 constructs the point-in-time graph snapshot at the same historical time T.

This method enables the system to balance the trade-offs between storage requirements, processing time, and temporal accuracy in historical graph analytics queries.

Figure 5:
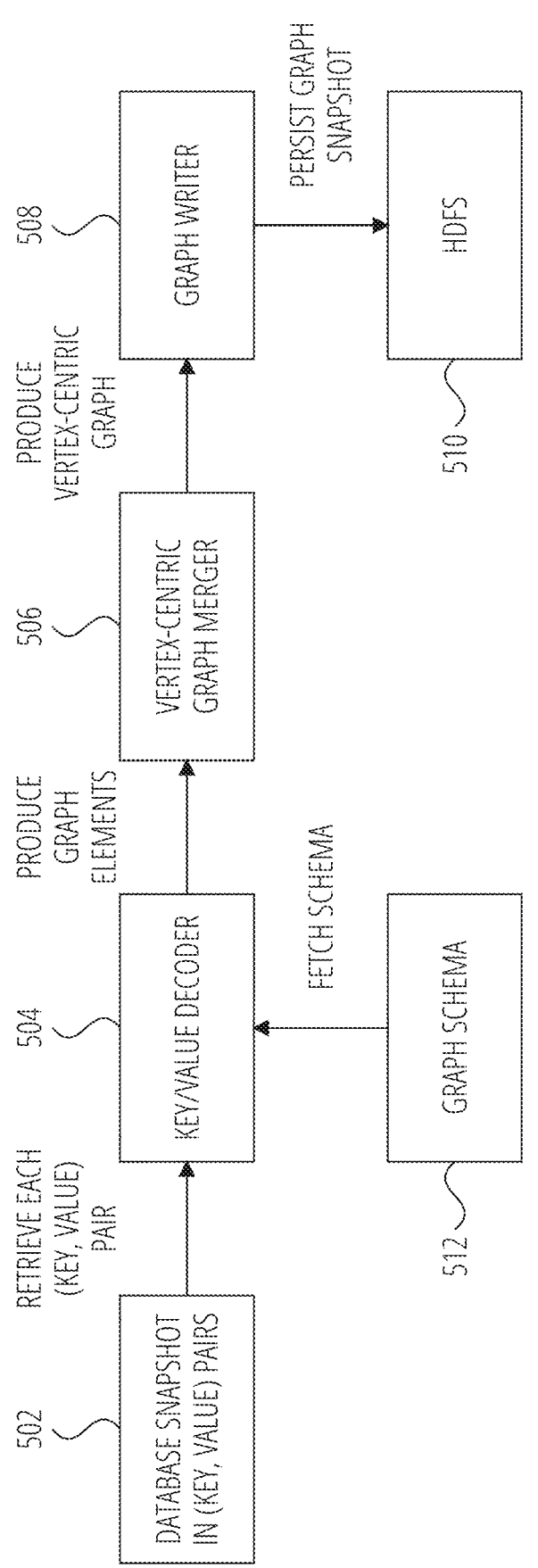
FIG. 5 is a block diagram illustrating a sequence in accordance with one example embodiment.

FIG. 5 is a block diagram illustrating a sequence in accordance with one example embodiment. A database snapshot is represented by a sequence of key/value pairs (e.g., database snapshot in (key, value) pairs 502). The key/value decoder 504 relies on the fetched graph schema (from graph schema 512) to decode the retrieved key/value pair and produce the graph elements that include the vertices, edges, and properties that belong to the vertices and edges. A vertex-centric graph merger 506 groups all of the graph elements such that all graph elements that belong to the same vertex are grouped into one single row. The grouped result is a vertex-centric graph that is represented by rows. A graph writer 508 then takes this vertex-centric graph and persists it to the HDFS 510, row by row. The result is the graph snapshot stored in HDFS 510 that corresponds to the database snapshot.

FIG. 6 illustrates an example routine 600 for building a point-in-time graph snapshot. Although the example routine 600 depicts a particular sequence of operations, the sequence may be altered without departing from the scope of the present disclosure. For example, some of the operations depicted may be performed in parallel or in a different sequence that does not materially affect the function of the routine 600. In other examples, different components of an example device or system that implements the routine 600 may perform functions at substantially the same time or in a specific sequence.

According to some examples, the method includes accessing a stream of data from a transactional graph database at block 602. In one example embodiment, the point-in-time global graph application 124 performs the operation of block 602.

According to some examples, the method includes receiving, at a scalable persistent computational platform that is separate from the transactional graph database, a graph analytics query that indicates a time attribute value at block 604. In one example embodiment, the point-in-time global graph application 124 performs the operation of block 604.

According to some examples, the method includes in response to receiving the graph analytics query, constructing, at the scalable persistent computational platform, a point-in-time graph snapshot based on the stream of data and the time attribute value at block 606. In one example embodiment, the point-in-time global graph application 124 performs the operation of block 606.

According to some examples, the method includes processing, at the scalable persistent computational platform, the graph analytics query with the point-in-time graph snapshot at block 608. In one example embodiment, the point-in-time global graph application 124 performs the operation of block 608.

Figure 7:
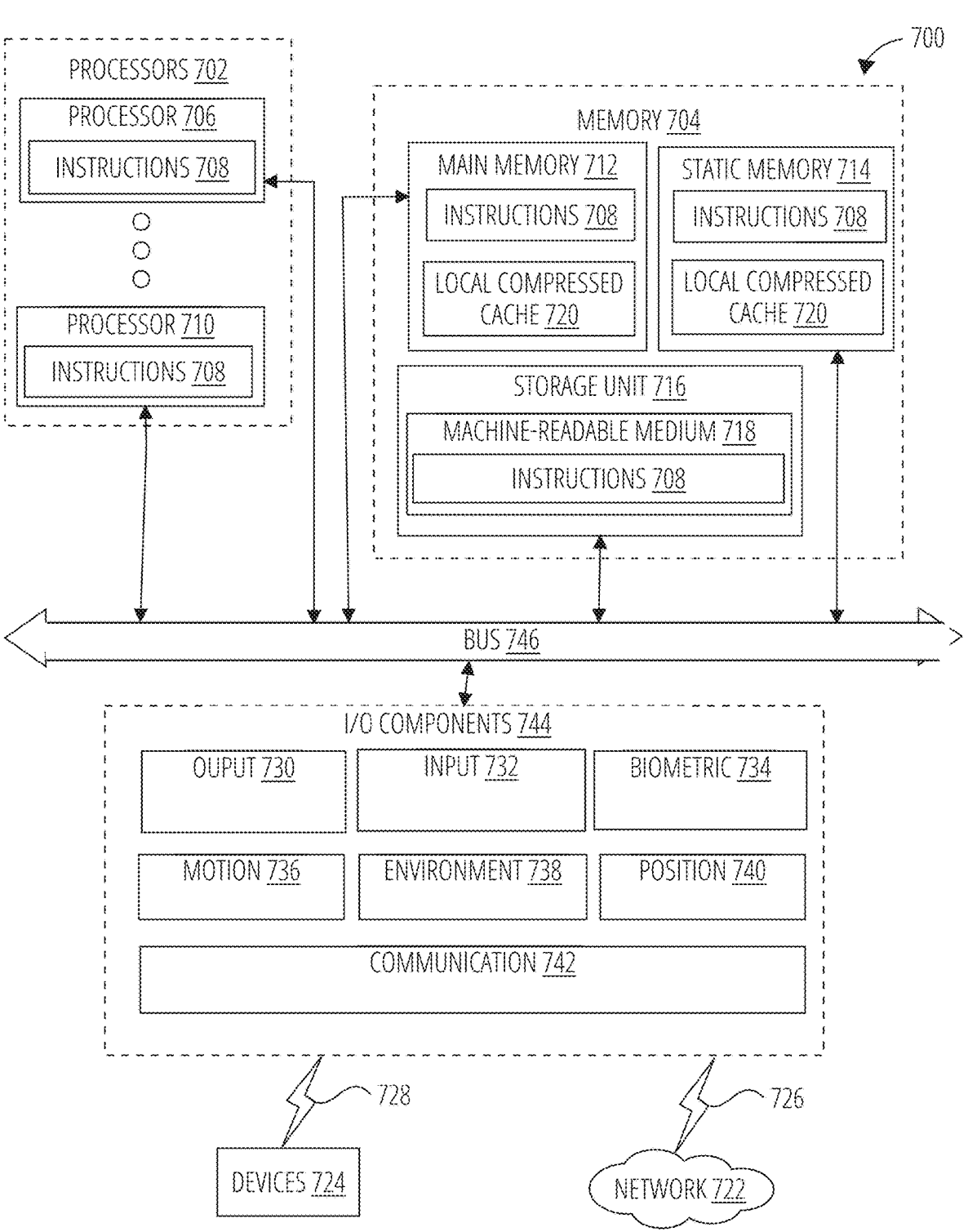
FIG. 7 is a diagrammatic representation of a machine in the form of a computer system within which a set of instructions may be executed for causing the machine to perform any one or more of the methodologies discussed herein, according to an example embodiment.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 744, which may be configured to communicate with each other via a bus 746. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 746. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 744 may include a wide variety of components to receive input, provide output, produce output, transmit information, exchange information, capture measurements, and so on. The specific I/O components 744 that are included in a particular machine will depend on the type of machine. For example, portable machines such as mobile phones may include a touch input device or other such input mechanisms, while a headless server machine will likely not include such a touch input device. It will be appreciated that the I/O components 744 may include many other components that are not shown in FIG. 7. In various example embodiments, the I/O components 744 may include output components 730 and input components 732. The output components 730 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 732 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 744 may include biometric components 734, motion components 736, environmental components 738, or position components 740, among a wide array of other components. For example, the biometric components 734 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 736 include acceleration sensor components (e.g., accelerometer), gravitation sensor components, rotation sensor components (e.g., gyroscope), and so forth. The environmental components 738 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 740 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 744 further include communication components 742 operable to couple the machine 700 to a network 722 or devices 724 via a coupling 726 and a coupling 728, respectively. For example, the communication components 742 may include a network interface component or another suitable device to interface with the network 722. In further examples, the communication components 742 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 742 may detect identifiers or include components operable to detect identifiers. For example, the communication components 742 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 742, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 722, using a transmission medium, via a network interface device (e.g., a network interface component included in the communication components 742) and using any one of a number of well-known transfer protocols (e.g., hypertext transfer protocol (HTTP)). Similarly, the instructions 708 may be transmitted or received using a transmission medium via the coupling 728 (e.g., a peer-to-peer coupling) to the devices 724.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a computer-implemented method comprising: accessing a stream of data from a transactional graph database; receiving, at a scalable persistent computational platform that is separate from the transactional graph database, a graph analytics query that indicates a time attribute value; in response to receiving the graph analytics query, constructing, at the scalable persistent computational platform, a point-in-time graph snapshot based on the stream of data and the time attribute value; and processing, at the scalable persistent computational platform, the graph analytics query with the point-in-time graph snapshot.

In Example 2, the subject matter of Example 1 includes, wherein the stream of data comprises a plurality of database snapshots of the transactional graph database and a stream of database mutation logs of the transactional graph database.

In Example 3, the subject matter of Example 2 includes, storing the plurality of database snapshots and the stream of database mutation logs at the scalable persistent computational platform.

In Example 4, the subject matter of Examples 2-3 includes, wherein constructing the point-in-time graph snapshot further comprises: constructing the point-in-time graph snapshot corresponding to the time attribute value based on one or more database snapshots of the plurality of database snapshots, the one or more database snapshots corresponding to the time attribute value, and one or more database mutation logs from the stream of database mutation logs, the one or more database mutation logs corresponding to the time attribute value.

In Example 5, the subject matter of Example 4 includes, wherein the one or more database mutation logs comprise a combination of unmerged database mutation logs and merged database mutation logs corresponding to the time attribute value.

In Example 6, the subject matter of Examples 2-5 includes, wherein constructing the point-in-time graph snapshot further comprises: constructing, at the scalable persistent computational platform, the point-in-time graph snapshot corresponding to the time attribute value based on the constructed point-in-time database snapshot corresponding to the time attribute value.

In Example 7, the subject matter of Examples 2-6 includes, wherein constructing the point-in-time graph snapshot further comprises: identifying a time window comprising a last database snapshot prior to the time attribute value and one or more database mutation logs between the last database snapshot and an unmerged database mutation log prior to the time attribute value.

In Example 8, the subject matter of Example 7 includes, merging the one or more database mutation logs identified in the time window.

In Example 9, the subject matter of Examples 1-8 includes, wherein the graph analytics query is processed at the scalable persistent computational platform, and a graph transactional query is processed at the transactional graph database.

In Example 10, the subject matter of Examples 1-9 includes, wherein the graph analytics query and a graph transactional query are processed on separate systems.

Example 11 is a computing apparatus comprising: a Processor; and a memory storing instructions that, when executed by the Processor, configure the apparatus to: access a stream of data from a transactional graph database; receive, at a scalable persistent computational platform that is separate from the transactional graph database, a graph analytics query that indicates a time attribute value; in response to receiving the graph analytics query, constructing, at the scalable persistent computational platform, a point-in-time graph snapshot based on the stream of data and the time attribute value; and process, at the scalable persistent computational platform, the graph analytics query with the point-in-time graph snapshot.

In Example 12, the subject matter of Example 11 includes, wherein the stream of data comprises a plurality of database snapshots of the transactional graph database and a stream of database mutation logs of the transactional graph database.

In Example 13, the subject matter of Example 12 includes, wherein the instructions further configure the apparatus to: store the plurality of database snapshots and the stream of database mutation logs at the scalable persistent computational platform.

In Example 14, the subject matter of Examples 12-13 includes, wherein constructing the point-in-time graph snapshot further comprises: construct the point-in-time graph snapshot corresponding to the time attribute value based on one or more database snapshots of the plurality of database snapshots, the one or more database snapshots corresponding to the time attribute value, and one or more database mutation logs from the stream of database mutation logs, the one or more database mutation logs corresponding to the time attribute value.

In Example 15, the subject matter of Example 14 includes, wherein the one or more database mutation logs comprise a combination of unmerged database mutation logs and merged database mutation logs corresponding to the time attribute value.

In Example 16, the subject matter of Examples 12-15 includes, wherein constructing the point-in-time graph snapshot further comprises: construct, at the scalable persistent computational platform, the point-in-time graph snapshot corresponding to the time attribute value based on the constructed point-in-time database snapshot corresponding to the time attribute value.

In Example 17, the subject matter of Examples 12-16 includes, wherein constructing the point-in-time graph snapshot further comprises: identify a time window comprising a last database snapshot prior to the time attribute value and one or more database mutation logs between the last database snapshot and an unmerged database mutation log prior to the time attribute value.

In Example 18, the subject matter of Example 17 includes, wherein the instructions further configure the apparatus to: merge the one or more database mutation logs identified in the time window.

In Example 19, the subject matter of Examples 11-18 includes, wherein the graph analytics query is processed at the scalable persistent computational platform, and a graph transactional query is processed at the transactional graph database.

Example 20 is a non-transitory computer-readable storage medium, the computer-readable storage medium including instructions that when executed by a computer, cause the computer to: access a stream of data from a transactional graph database; receive, at a scalable persistent computational platform that is separate from the transactional graph database, a graph analytics query that indicates a time attribute value; in response to receiving the graph analytics query, constructing, at the scalable persistent computational platform, a point-in-time graph snapshot based on the stream of data and the time attribute value; and process, at the scalable persistent computational platform, the graph analytics query with the point-in-time graph snapshot.

Example 21 is at least one machine-readable medium including instructions that, when executed by processing circuitry, cause the processing circuitry to perform operations to implement of any of Examples 1-20.

Example 22 is an apparatus comprising means to implement of any of Examples1-20.

Example 23 is a system to implement of any of Examples 1-20.

Example 24 is a method to implement of any of Examples 1-20.

What is claimed is:

1. A computer-implemented method comprising:

accessing a stream of data from a transactional graph database;

receiving, at a scalable persistent computational platform that is separate from the transactional graph database, a graph analytics query that indicates a time attribute value;

in response to receiving the graph analytics query, constructing, at the scalable persistent computational platform, a point-in-time graph snapshot based on the stream of data and the time attribute value by reconstructing the point-in-time graph snapshot exclusively from database snapshots and database mutation logs already stored at the scalable persistent computational platform, without making any further requests to the transactional graph database after receiving the graph analytics query; and processing, at the scalable persistent computational platform, the graph analytics query with the reconstructed point-in-time graph snapshot.

2. The computer-implemented method of claim 1, wherein the stream of data comprises a plurality of database snapshots of the transactional graph database and a stream of database mutation logs of the transactional graph database.

3. The computer-implemented method of claim 2, further comprising:

storing the plurality of database snapshots and the stream of database mutation logs at the scalable persistent computational platform.

4. The computer-implemented method of claim 2, wherein constructing the point-in-time graph snapshot further comprises:

constructing the point-in-time graph snapshot corresponding to the time attribute value based on one or more database snapshots of the plurality of database snapshots, the one or more database snapshots corresponding to the time attribute value, and one or more database mutation logs from the stream of database mutation logs, the one or more database mutation logs corresponding to the time attribute value.

5. The computer-implemented method of claim 4, wherein the one or more database mutation logs comprise a combination of unmerged database mutation logs and merged database mutation logs corresponding to the time attribute value.

6. The computer-implemented method of claim 2, wherein constructing the point-in-time graph snapshot further comprises:

constructing, at the scalable persistent computational platform, the point-in-time graph snapshot corresponding to the time attribute value based on the constructed point-in-time database snapshot corresponding to the time attribute value.

7. The computer-implemented method of claim 2, wherein constructing the point-in-time graph snapshot further comprises:

identifying a time window comprising a last database snapshot prior to the time attribute value and one or more database mutation logs between the last database snapshot and an unmerged database mutation log prior to the time attribute value.

8. The computer-implemented method of claim 7, further comprising:

merging the one or more database mutation logs identified in the time window.

9. The computer-implemented method of claim 1, wherein the graph analytics query is processed at the scalable persistent computational platform, and a graph transactional query is processed at the transactional graph database.

10. The computer-implemented method of claim 1, wherein the graph analytics query and a graph transactional query are processed on separate systems.

11. A computing apparatus comprising:

a processor; and a memory storing instructions that, when executed by the processor, configure the apparatus to:

access a stream of data from a transactional graph database;

receive, at a scalable persistent computational platform that is separate from the transactional graph database, a graph analytics query that indicates a time attribute value;

in response to receiving the graph analytics query, constructing, at the scalable persistent computational platform, a point-in-time graph snapshot based on the stream of data and the time attribute value by reconstructing the point-in-time graph snapshot exclusively from database snapshots and database mutation logs already stored at the scalable persistent computational platform, without making any further requests to the transactional graph database after receiving the graph analytics query; and process, at the scalable persistent computational platform, the graph analytics query with the reconstructed point-in-time graph snapshot.

12. The computing apparatus of claim 11, wherein the stream of data comprises a plurality of database snapshots of the transactional graph database and a stream of database mutation logs of the transactional graph database.

13. The computing apparatus of claim 12, wherein the instructions further configure the apparatus to:

store the plurality of database snapshots and the stream of database mutation logs at the scalable persistent computational platform.

14. The computing apparatus of claim 12, wherein constructing the point-in-time graph snapshot further comprises:

construct the point-in-time graph snapshot corresponding to the time attribute value based on one or more database snapshots of the plurality of database snapshots, the one or more database snapshots corresponding to the time attribute value, and one or more database mutation logs from the stream of database mutation logs, the one or more database mutation logs corresponding to the time attribute value.

15. The computing apparatus of claim 14, wherein the one or more database mutation logs comprise a combination of unmerged database mutation logs and merged database mutation logs corresponding to the time attribute value.

16. The computing apparatus of claim 12, wherein constructing the point-in-time graph snapshot further comprises:

construct, at the scalable persistent computational platform, the point-in-time graph snapshot corresponding to the time attribute value based on the constructed point-in-time database snapshot corresponding to the time attribute value.

17. The computing apparatus of claim 12, wherein constructing the point-in-time graph snapshot further comprises:

identify a time window comprising a last database snapshot prior to the time attribute value and one or more database mutation logs between the last database snapshot and an unmerged database mutation log prior to the time attribute value.

18. The computing apparatus of claim 17, wherein the instructions further configure the apparatus to:

merge the one or more database mutation logs identified in the time window.

19. The computing apparatus of claim 11, wherein the graph analytics query is processed at the scalable persistent computational platform, and a graph transactional query is processed at the transactional graph database.

20. A non-transitory computer-readable storage medium, the computer-readable storage medium including instructions that when executed by a computer, cause the computer to:

access a stream of data from a transactional graph database;

receive, at a scalable persistent computational platform that is separate from the transactional graph database, a graph analytics query that indicates a time attribute value;

in response to receiving the graph analytics query, constructing, at the scalable persistent computational platform, a point-in-time graph snapshot based on the stream of data and the time attribute value by reconstructing the point-in-time graph snapshot exclusively from database snapshots and database mutation logs already stored at the scalable persistent computational platform, without making any further requests to the transactional graph database after receiving the graph analytics query; and process, at the scalable persistent computational platform, the graph analytics query with the reconstructed point-in-time graph snapshot.

* * * * *